United States Patent
Heitz

(12) 
(10) Patent No.: US 6,412,393 B1
(45) Date of Patent: Jul. 2, 2002

(54) PISTON PIN RETAINER AND METHOD OF USING THE SAME

(75) Inventor: William J. Heitz, deceased, late of Naples, FL (US), by Sandra Heitz, Richard J. Langer, legal representatives

(73) Assignee: Exacto Spring Corporation, Grafton, WI (US)

( * ) Notice: Subject to any disclaimer, the term of this patent is extended or adjusted under 35 U.S.C. 154(b) by 0 days.

(21) Appl. No.: 09/480,201

(22) Filed: Jan. 10, 2000

(51) Int. Cl.[7] .............................. F16J 1/18; F16B 21/20
(52) U.S. Cl. ........................ 92/187; 403/155; 411/517; 384/903
(58) Field of Search ......................... 92/187; 403/155; 411/517, 519; 384/903

(56) References Cited

U.S. PATENT DOCUMENTS

| | | |
|---|---|---|
| 850,185 A | 4/1907 | Roberts |
| 879,007 A | 2/1908 | Root |
| 883,060 A | 3/1908 | Stratton |
| 957,764 A | 5/1910 | Galbraith |
| 1,637,247 A | 7/1927 | Snyder |
| 2,255,217 A | 9/1941 | Hill ............................. 411/517 |
| 2,295,199 A * | 9/1942 | Carvelli ....................... 92/187 |
| 2,524,273 A | 10/1950 | Saler |
| 3,324,681 A | 6/1967 | Burns et al. |
| 4,182,579 A * | 1/1980 | McCormick et al. ........ 411/517 |
| 4,597,139 A | 7/1986 | Lau |
| 4,630,958 A | 12/1986 | McCallister |
| 4,699,553 A | 10/1987 | Lesikar |
| 4,889,327 A | 12/1989 | Seyler |
| 4,909,370 A | 3/1990 | Limbacher et al. |
| 4,917,003 A | 4/1990 | Kollross |
| 5,048,996 A | 9/1991 | DuBois et al. |
| 5,131,785 A | 7/1992 | Shimazaki |
| 5,417,613 A | 5/1995 | Aiken |

* cited by examiner

Primary Examiner—F. Daniel Lopez
(74) Attorney, Agent, or Firm—Reinhart Boerner Van Deuren s.c.

(57) ABSTRACT

A piston-retaining mechanism for removable engagement with a piston head to secure a piston pin therein, the mechanism including a base coil portion and a subsequent coil portion, each coil portion approximating the other at a distance less than the cross-sectional dimension of either coil portion.

20 Claims, 1 Drawing Sheet

PISTON PIN RETAINER AND METHOD OF USING THE SAME

BACKGROUND OF THE INVENTION

FIELD OF THE INVENTION

The present invention relates generally to piston assemblies and, in particular, to an improved piston pin retainer for securing a piston pin within a piston bore.

A piston pin maintains alignment of a piston in a cylinder bore while permitting some angular displacement of the piston rod. The piston pin floats freely in the bore of the piston, promoting even and uniform wear during operation. Conventionally, piston pins are retained within the piston bore by rings placed in grooves near the piston bore opening. Such rings are subject to failure, and upon such failure, the piston pin escapes the piston bore and scores the cylinder wall. Furthermore, the insertion of the retainer rings into the grooves of the piston bore is manual labor intensive and time consuming, resulting in considerable increase in the cost of piston assembly.

Others have attempted to improve piston assembly and piston pin retainers, but without much success. U.S. Pat. No. 2,255,217, discloses two different types of piston pin retaining mechanisms, each having substantial problems and disadvantages. The first mechanism disclosed is a generally straight, helical spring having two ends fastened together to form an annular ring. This type of spring does not exert sufficient force against the inner walls of the piston bore to sufficiently retain the piston pin in place. Furthermore, it is difficult to manually fasten the ends of the generally straight, helical springs together so as to form the ring. When presented in bulk, the springs intertwine and the assembler must untangle and disengage each of the springs before placement, into the bore groove. Increased assembly time increases production costs. This second helical spring is, likewise, unsatisfactory; its design configuration unduly increases material cost and hinders piston assembly.

U.S. Pat. No. 1,637,247 discloses a disc/split ring combination retainer. An annular disc is placed within the groove of the piston bore and a split ring abuts the annular disc to hold the piston pin in place. This device also requires an undue amount of labor because two separate retaining mechanisms are manually installed as part of the manufacture and assembly. Additionally, the shape of the split ring causes the rings to intertwine over the course of shipping and during bulk storage. The time required to untangle the rings prevents efficient and cost effective manufacture and assembly.

In recent years, most piston manufacturers have used a bent wire clip, commonly referred to as a "G-clip" because of its alphabetic resemblance. The "G" clip has an open periphery and, like other piston pins, intertwines when shipped in bulk, preventing automated dispensation during piston assembly. For the same reason, the "G" clip does not fully engage (less than 75% of) the piston pin when positioned within the piston bore groove. Less than complete engagement, increases the risk of failure and may result in the piston pin scoring the cylinder bore wall.

OBJECTS OF THE INVENTION

It is an object of the present invention, to overcome various problems and disadvantages associated with the prior art, including those discussed above. Accordingly, it is an, objective of the present invention to effectively retain a piston pin within a piston bore to prevent scoring of the cylinder wall. This and other objectives can be accomplished with an apparatus and/or through a method of the type described herein.

It will be understood by those skilled in the art that one or more aspects of this invention can meet certain objectives, while one or more aspects can meet certain other objectives. Each objective may not apply equally, in all instances, to every aspect of the present invention. As such, the objects provided herein can be viewed in the alternative with respect to any one aspect of the present invention.

Accordingly, it can also be an objective of the present invention to provide an apparatus for retaining a piston pin having a configuration which prevents entanglement during shipping or storage.

It can be a further objective of the present invention to provide a piston pin retainer that can be used with automatic feed mechanisms to facilitate efficient, cost-effective piston assembly.

Yet another objective of the present invention is to provide an apparatus and/or method to increase contact of a retainer mechanism with a piston pin, so as to better prevent a piston pin from releasing and scoring a cylinder wall.

Other objects, features, benefits and advantages of the present invention will be apparent from the following summary and descriptions of preferred embodiments, and will be readily apparent to those skilled in the art having knowledge of various piston components, mechanisms and assembly procedures. Such objects, features benefits, and advantages will be apparent from the above as taken in conjunction with the following summary, descriptions, figures and all reasonable inferences to be drawn therefrom.

SUMMARY OF THE INVENTION

The disadvantages and limitations of the background art discussed above are overcome by the apparatus, assemblies and/or methods of present invention.

In part, the present invention provides a piston-retaining coil including a base coil and a coil portion post-base and/or subsequent thereto. The post-base/subsequent coil portion can be one or more loops or turns continuous with the base coil. Although the subsequent coil portion can be described as wound about a core, it would be well-known to one skilled in the art that a subsequent coil can be configured to provide a square, rectangle, oval or other such non-loop structure, or series of such non-loop structures. The base coil can be annular with a circumference about equal to or somewhat greater than the circumference of a piston bore groove within which it can be inserted.

Regardless, a subsequent coil portion can be offset from the base coil and have an axis parallel to that of the base coil. The base coil can lie on a plane substantially perpendicular to the axis of the base coil and subsequent coil portions, and can continue at an angle to provide for the subsequent coil portion and/or an apex coil or portion thereof. A coil arranged in this manner takes the shape of a non-helical spring. A piston-retaining coil can be configured, however, with no angle of departure, the subsequent coil portion coplanar with the base coil on a plane perpendicular to the respective axes of the coils.

The coil of the present invention has two end portions and a cross-sectional configuration that can be circular, square, oval, or any other configuration as would be known by those skilled in the art. The base coil has an end-terminus positioned proximate the subsequent coil portion. The distance between the end-terminus of the base coil and a subsequent coil portion is less than the cross-sectional diameter of the coil. Such an arrangement and configuration prevents coils from intertwining, and permits use thereof in assembly lines with an automated feed mechanism.

The subsequent coil end-terminus can be positioned near the subsequent coil portion at a distance less than the cross-sectional diameter of the coil. As discussed above, this structure prevents entanglement with other coils.

The coil and related apparatus of this invention can be made from tempered or heat-treated steel, phosmusic wire, or other similar material known by those skilled in the art. Such a coil or retainer can be obtained from Exacto Spring Corporation of Grafton, Wis.

In part, the present invention also provides a piston-retaining spring having a base coil and a subsequent coil portion continuous with the base coil. The base coil can be in the shape of an annular ring to fit within a circumferential piston bore. The subsequent coil portion may also be annular with at least one loop, turn or part thereof. However, as discussed above, a subsequent coil portion can also have a non-loop configuration. The subsequent coil portion can have an axis substantially parallel with an axis of the base coil, however, each axis is offset from one another so as to provide a non-helical structure. Regardless, the coil diameter can be non-uniform; for instance, the subsequent coil portion may be smaller in diameter than the diameter of the base coil and/or the corresponding annular piston bore.

The base coil and a subsequent coil portion of the piston-retaining spring may lie coplanar with one another, each coil perpendicular to the axis of the base coil. The base coil can depart from the plane at an angle to form the subsequent coil portion. Preferably, the angle of departure should be at an angle to create a space between the base coil and subsequent coil portions no more than the cross-sectional diameter of the spring, so as to prevent coil from entanglement.

The base coil and the subsequent coil approximate one another at a distance less than any cross sectional dimension of the spring. As discussed more fully above, this arrangement and configuration prevents entanglement during shipping and packaging and as the invention is used.

In part, the present invention is also a method of using a spring to increase surface area contact with a piston head and a piston pin positioned therein. A floating piston pin, which can either be hollow or solid, may be positioned within a bore of a piston head. The bore may be cylindrical with a circumference slightly greater than the piston pin so the piston pin can float freely within the bore. An annular groove in the wall of the piston bore is positioned tangential to the piston pin near the opening of the bore to the piston skirt. Inserting the spring into the bore and compressing it within the circumferential groove increases the degree or amount of surface contact of the spring with the bore wall and/or the pin positioned therein.

The spring can be configured as described elsewhere herein. In preferred embodiments, the base coil lies within a plane and departs at a point and/or an angle to provide a subsequent coil portion. The surface contact area of the spring with the bore and/or piston pin increases inversely proportional to the point of departure or, alternatively, proportional to the angle of departure.

To situate the spring within the bore, a needle-nose pliers or similar such device can be used to grasp the spring and manipulate it to fit within the bore groove. As the spring is compressed within the circumferential groove, it conforms to the annular dimension and configuration of the groove, increasing the degree of surface contact with not only the groove but also the pin adjacent thereto. An increase in surface contact with the piston pin affords a greater assurance against displacement during piston movement. The increase in surface contact, between that provided by an initial spring configuration and that afforded by a compressed configuration, is inversely proportional to the angle and/or point of departure of the subsequent coil from the base coil plane. For example, a point of departure of a subsequent coil approximately midway along a base coil circumference will afford a greater increase in surface contact upon compression than would a point of departure three-quarters along the base coil circumference. In a similar fashion, a greater angle of departure can afford a greater increase in surface contact than would a gradual angle of departure to the subsequent coil portion.

In part, this invention is also a piston assembly that has both a piston head and a connector member, commonly referred to as a connector rod or a piston rod, extending from the drive train. The piston head has a bore therethrough with a circumferential groove near the opening of the bore. A second circumferential groove may be positioned at the opposite end of the bore in a similar location. The groove can have a cross-sectional configuration that is substantially c-shaped, but which can also be U, V or box-shaped. A coupling member is axially positioned in a mating relationship with the bore and pivotally engages the bearing surface of the connecting member.

The coupling member is typically a pin or rod that can be either hollow or solid, with a length somewhat less than that of the cylindrical bore. The coupling member is axially positioned within the cylindrical bore and has a diameter less than the bore so that it may rotate freely within the bore. A coil retains the coupling member axially within the bore when positioned in the circumferential groove.

The coil has a base coil and a subsequent coil portion continuous with the base portion. The subsequent coil portion can be one or more loops or turns continuous with the base coil. The base coil is in a plane substantially perpendicular to the base coil axis and can continue at an angle to the plane to provide for a subsequent coil portion. The center of each subsequent coil can be slightly offset to provide the coil a non-helical structure. The coil has a cross-sectional configuration, which can be circular, rectangular, oval, or any other configuration known by those skilled in the art.

In preferred assembly embodiments, the bore has two circumferential grooves, each groove contiguous with a corresponding end of the aforementioned coupling member. A retaining coil, arranged and/or configured as more fully described herein, is positioned within each groove to secure the coupling member within the bore. In highly preferred embodiments, each circumferential groove has a cross-sectional configuration substantially c-shaped, and each coil has a substantially circular cross-sectional configuration, so as to provide a mating relationship with the corresponding groove.

DESCRIPTION OF THE DRAWINGS

These and other advantages of the present invention are best understood with reference to the drawings, in which.

DETAILED DESCRIPTION OF PREFERRED EMBODIMENTS

Preferred embodiments of the present invention can be described with reference to FIGS. 1–3.

Figure 1:
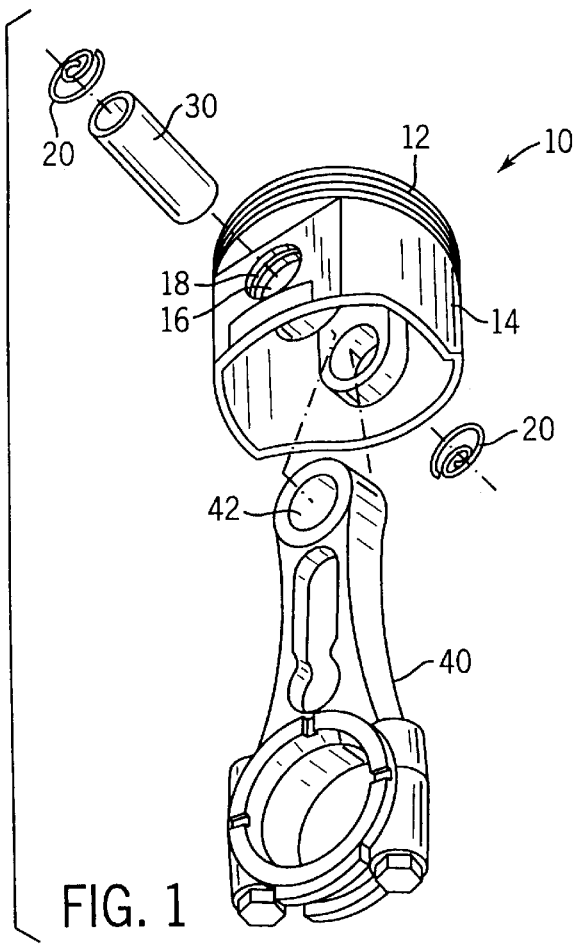
FIG. 1 is an exploded view of a piston assembly, in accordance with the teachings of the present invention.

FIG. 1 illustrates a piston assembly 10 for use in hydraulic cylinders, combustion engines, or any other article that utilizes a piston. The piston assembly 10 includes a piston head 12 and a piston skirt 14 that extends laterally from the piston head 12. A piston bore 16 extends axially through the piston head 12 and opens into the skirt 14 at two opposed locations. One or more annular grooves 18 are positioned in the walls of the piston bore 16 near openings to the piston skirt 14.

A coupling member 30, which can be either hollow or solid and in the same general shape as the piston bore 16, can be positioned in mating relationship to the bore. The coupling member 30 has an outer circumference less than the inner circumference of the piston bore 16 so that the coupling member 30 may rotate freely within the bore 16. The coupling member 30 pivotally engages a connector member 40, commonly be referred to as a connector rod or piston rod, at the bearing surface 42 of the connector member 40 while axially positioned within the bore 16.

To locate, retain and secure the coupling member 30 within the bore 16 of the piston head 12, a coil 20, which can be a spring or other configuration of the type described herein, is manipulated to fit within with groove 18 of the piston bore 16. The coil 20 of the present invention and its use in conjunction with piston assembly 10, in part, distinguishes the present invention over the prior art.

Figure 2A:
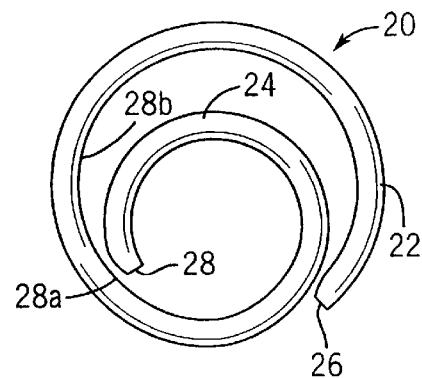
FIG. 2A is a top view of one embodiment of a piston pin retaining coil, in accordance with the teachings of the present invention.

As shown more clearly in FIG. 2A, the coil 20 includes a base coil portion 22 and a subsequent coil portion 24 continuous with the base coil portion 22. The subsequent coil portion 24 circumscribes an axis parallel to a corresponding axis of the base coil portion 22, the axis of subsequent coil portion 24 offset from that of the base coil portion 22 and providing coil 20 a non-helical structure. The base coil portion 22 has an outer periphery corresponding to the shape of the piston bore 16, with a cross-dimension slightly larger than the diameter of piston bore 16. The subsequent coil portion 24 can be somewhat smaller in cross-dimension than the base coil portion 22.

The base coil portion 22 can rest in a plane and has an axis substantially perpendicular thereto, but can in alternate embodiments depart therefrom at an angle to provide for the subsequent coil portion 24. The angle of departure should not be so large as to permit a void between the base coil portion 22 and the subsequent coil portion 24, lest another coil 20 becomes entangled. An angle of departure is observed in the coil of FIG. 3. As shown therein, any void between coil portions 22 and 24 is insufficient to permit intertwining with another coil. In another embodiment of the present invention, there is no angle of departure from the base coil portion 22 and the subsequent coil portion 24 rests within the same plane as the base coil portion 22.

Figure 3:
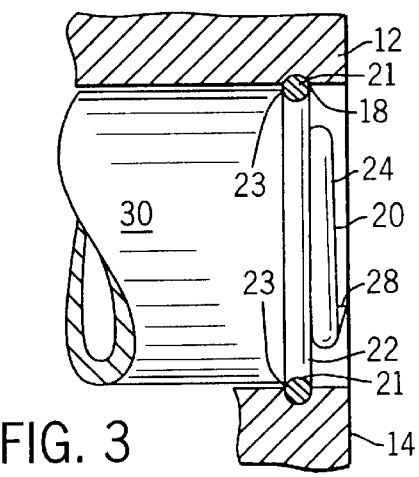
FIG. 3 is a cross-sectional view illustrating the piston pin retaining coil of FIG. 2A securing a coupling member axially within a piston, according to the teachings of the present invention.

As shown in FIG. 3, a preferred embodiment of coil 20 has a cross-sectional configuration 21. However, it would be clear to one skilled in the art made aware of this invention to utilize a rectangular, square, or other configuration in alternate embodiments. The cross-sectional configuration 21 may vary in cross-dimension between the base coil 22 and the subsequent coil portion 24, or along portions thereof. The cross-dimension of the cross-sectional configuration 21 is such that coil 20 fits inside the groove 18 yet also extends inwardly towards the center of the bore 16, to provide a surface contact area 23 engaging the coupling member 30.

The coil 20 has an end-terminus 26 at the extremity of the base coil portion 22, and an end-terminus 28 at the extremity of the subsequent coil portion 28, as illustrated in FIGS. 2 and 3. The end-terminus 26 of the base coil 22 is closely adjacent to the subsequent coil portion 24 at a distance less than the cross-sectional configuration 21 dimension of the coil 20. Similarly, the end-terminus 28 of the subsequent coil portion 24 is positioned closely adjacent another portion of the spring at a distance less than the cross-sectional configuration 21 dimension of the coil 20. Such a distance prevents a coil 20 from intertwining with other coils when packaged in bulk.

As shown in FIG. 2A, coil end-terminus 28 is positioned proximate to point 28a. Alternatively, end-terminus 28 can be positioned proximate to point 28b or at various other points along either base coil portion 22 and subsequent coil portion 24. Repositioning end-terminus 28 from point 28a.

Figure 2B:
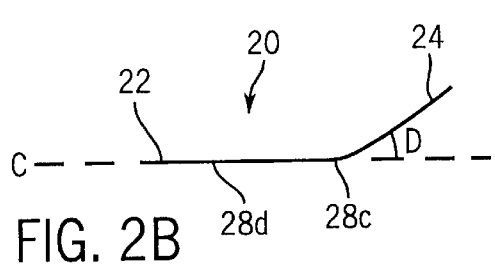
FIG. 2B is a schematic representation of a partial coil configuration, in accordance with the present invention.

FIG. 2A provides a perspective of coil 20 irrespective of a planar relationship between portions 22 and 24. In a preferred embodiment of the present invention, subsequent coil portion 24 departs from a planar configuration of base coil portion 22. FIG. 2B is a schematic representation of a segment of coil 20 showing a non-planar relationship between coil portions 22 and 24. As shown therein, base coil portion 22 can rest on or parallel to a plane shown in FIG. 2B as dashed line C. Coil portion 22 can depart from the plane of line C at point 28c at an angle D to provide subsequent coil portion 24. Alternatively, the point of departure can be closer to the end-terminus of coil portion 22, such as at point 28d. In yet other embodiments of the present invention, the angle of departure from the plane of line C can be greater or less than angle D. A coil such as that represented in FIG. 2B can be used to increase the surface contact area with a piston bore and/or a piston pin, the area of contact increasing inversely proportional to the point of departure or, alternatively, proportional to the angle of departure.

With reference to FIG. 3, the coil 20 is compressed into the groove 18. When inserted in the groove 18 of the piston bore 16, the coil 20 will exert force radially, outwards towards the wall of the piston bore 16 within the groove 18, as the circumference of the annular groove 18 is slightly less than the relaxed periphery of the coil 20. The outward force securely positions the coil 20 within the groove 18 for engagement with coupling member 30.

As discussed more fully above, but with reference to FIG. 3 and FIG. 2B, compressing the coil 20 in groove 18 increases the surface area 23 of coil 20 with the coupling member 30. A greater surface contact area 23 further ensures retention of the coupling member within the piston bore 16.

While the principles of this invention have been described in connection with specific embodiments, it should be understood clearly that these descriptions, along with the chosen figures, are made only by way of example and are not intended to limit the scope of this invention, in any manner. For instance, while a coil or other such retaining mechanism of this invention can have at least one portion thereof configured to mate with a piston bore groove, other non-mating or non-contacting portions can have other configurations which provide for the same engagement and placement functions. Likewise, while some embodiments of this invention are described as having one base coil of varying dimension in a base plane, it should be realized, in accordance with this invention, that various other embodiments can have multiple coils in a base plane or have a multiplicity of coils associated with a subsequent coil of the type described herein. Other advantages and features of this invention will become apparent from the following claims, with the scope thereof determined by the reasonable equivalents, as would be understood by those individuals skilled in the art.

What is claimed is:

1. A piston-retaining coil, comprising a base coil portion and a subsequent coil portion continuous with said base coil portion, said base coil portion having an axis offset from the axis of said subsequent coil portion, each said coil portion having a cross-sectional dimension and each said portion positioned proximate said other portion at a distance less than either of said cross-sectional dimensions.

2. The coil of claim 1 wherein said base coil lies substantially in a plane perpendicular to said base coil axis.

3. The coil of claim 2 wherein said base coil portion continues at an angle to said plane to provide said subsequent coil portion.

4. The coil of claim 1 wherein said subsequent coil portion has an end terminus positioned along said base coil portion.

5. The coil of claim 1 wherein said subsequent coil portion has an end terminus positioned along said subsequent coil portion.

6. The coil of claim 1 having a circular cross-sectional configuration.

7. A non-helical piston-retaining spring, comprising a base coil portion and a subsequent coil portion continuous with said base portion, each said portion having a cross-sectional dimension, said base coil portion having an end terminus positioned from said subsequent coil portion a distance less than either of said cross-sectional dimensions, said end terminus and said subsequent coil portion having a void therebetween, and said subsequent coil portion having an end terminus positioned along said spring and at a distance less than either of said cross-sectional dimensions.

8. The spring of claim 7 wherein said base coil has an axis, said base coil substantially in a plane perpendicular to said axis.

9. The spring of claim 8 wherein said base coil portion continues at an angle to said plane to provide said subsequent coil portion.

10. The spring claim 7 wherein said subsequent coil portion end terminus is positioned along said base coil portion.

11. The spring of claim 7 wherein said subsequent coil portion end terminus is positioned along said subsequent coil portion.

12. A method of using a spring to increase surface contact with a piston head and a piston pin therein, said method comprising:

providing said piston head with a bore for placement of said pin therethrough, said bore having a circumferential groove, and said pin having a circumferential dimension;

providing said spring, having a base coil portion and a subsequent coil portion continuous with said base coil portion, said base coil portion having an initial surface contact dimension, said contact dimension less than said pin circumferential dimension;

inserting said spring into said bore; and compressing said spring within said circumferential groove, said compression increasing circumferential surface contact of said spring with said pin.

13. The method of claim 12 wherein said base coil portion is in a plane and departs from said plane at a point to provide a subsequent coil portion, said surface contact increasing inversely proportional to said point of departure.

14. The method of claim 12 wherein said spring has a circular cross-sectional configuration.

15. The method of claim 12 wherein said bore groove is substantially c-shaped in cross-sectional configuration.

16. A piston assembly, comprising:

a piston head and a connector member from a drive train to said piston head, said piston head having a bore therethrough, said bore having a circumferential groove;

a coupling member having a mating relation with said bore and pivotably engaging said connector with said piston head; and a coil having a base coil portion and a subsequent coil portion continuous with said base portion, said base coil portion having an axis offset from the axis of said subsequent coil portion, each of said portion having a cross-sectional dimension and each said coil portion positioned proximate the other at a distance less than said respective coil cross-sectional dimension, said coil positioned within said circumferential groove.

17. The assembly of claim 16 wherein said bore has two circumferential grooves, each said groove contiguous with a corresponding end of said coupling member, and said assembly further including two said coils.

18. The assembly of claim 16 wherein said circumferential groove has a cross-sectional configuration substantially c-shaped.

19. The assembly of claim 18 wherein said coil has a substantially circular cross-sectional configuration and a mating relationship with said circumferential groove.

20. The assembly of claim 16 wherein said base coil is in a plane substantially perpendicular to said base coil axis and continues at an angle to said plane to provide said subsequent coil portion.

* * * * *

UNITED STATES PATENT AND TRADEMARK OFFICE
CERTIFICATE OF CORRECTION

PATENT NO.    : 6,412,393 B1
DATED         : July 2, 2002
INVENTOR(S)   : William J. Heitz It is certified that error appears in the above-identified patent and that said Letters Patent is hereby corrected as shown below:

<u>Column 6,</u>
Line 22, "Repositioning end-terminus 28 from point 28a" should be
-- Repositioning end-terminus 28 from point 28a to 28b increases the
the cross-sectional diameter of subsequent coil portion 24. Likewise,
in accordance with this invention, end-terminus 28 can approach
any point along coil portions 22 and 24, providing a range of cross-
dimensions for coil portion 24. --

Signed and Sealed this

Twenty-eighth Day of January, 2003

JAMES E. ROGAN
*Director of the United States Patent and Trademark Office*